(12) United States Patent
Kim et al.

(10) Patent No.: US 12,189,720 B2
(45) Date of Patent: Jan. 7, 2025

(54) IMAGE ANALYSIS DEVICE AND METHOD, AND METHOD FOR GENERATING IMAGE ANALYSIS MODEL USED FOR SAME

(71) Applicants: SK TELECOM CO., LTD., Seoul (KR); Seoul National University R&DB Foundation, Seoul (KR)

(72) Inventors: Taewan Kim, Seoul (KR); Gunhee Kim, Seoul (KR); Soochan Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 560 days.

(21) Appl. No.: 17/466,400

(22) Filed: Sep. 3, 2021

(65) Prior Publication Data

US 2021/0397902 A1    Dec. 23, 2021

Related U.S. Application Data

(63) Continuation of application No. PCT/KR2020/000291, filed on Jan. 7, 2020.

(30) Foreign Application Priority Data

Mar. 8, 2019   (KR) .................. 10-2019-0026852

(51) Int. Cl.
*G06F 18/21* (2023.01)
*G06F 18/23211* (2023.01)
*G06F 18/2431* (2023.01)
*G06N 5/04* (2023.01)

(52) U.S. Cl.
CPC .... *G06F 18/2185* (2023.01); *G06F 18/23211* (2023.01); *G06F 18/2431* (2023.01); *G06N 5/04* (2013.01)

(58) Field of Classification Search
CPC ........... G06F 18/2185; G06F 18/23211; G06F 18/2431; G06N 5/04; G06N 3/045; G06N 3/047; G06N 3/08; G06N 7/01; G06V 10/764; G06V 10/762; G06V 10/774;
(Continued)

(56) References Cited

U.S. PATENT DOCUMENTS

| 8,548,828 B1 * | 10/2013 | Longmire .............. G16H 40/67 |
| | | 706/45 |
| 9,087,297 B1 * | 7/2015 | Filippova ................ G06F 16/70 |
| 2010/0158332 A1 | 6/2010 | Rico et al. |

(Continued)

FOREIGN PATENT DOCUMENTS

| KR | 10-2009-0131626 A | 12/2009 |
| KR | 10-2015-0107579 A | 9/2015 |
| KR | 10-2015-0108673 A | 9/2015 |

*Primary Examiner* — Tom Y Lu
(74) *Attorney, Agent, or Firm* — WTA Patents

(57) ABSTRACT

In accordance with an aspect of the present disclosure, there is provided an image analysis method comprising, inputting a target image to an image analysis model composed of at least one expert generated by learning the training image; analyzing the target image based on an output value from the at least one expert; determining validity of an analysis result for the target image based on a probability of the input target image to belong to an input category of the at least one expert; and when it is determined that the analysis result for the target image is not valid, classifying the target image into a new category.

14 Claims, 13 Drawing Sheets

(58) Field of Classification Search
CPC .. G06V 10/82; G06T 1/60; G06T 7/00; G06T 2207/20081
See application file for complete search history.

(56) References Cited

U.S. PATENT DOCUMENTS

| | | |
|---|---|---|
| 2011/0255759 A1 | 10/2011 | Nishimura et al. |
| 2015/0332157 A1* | 11/2015 | Baughman ............ G06F 16/285 706/52 |
| 2016/0070972 A1* | 3/2016 | Jang .................... G06V 30/242 382/110 |
| 2016/0162492 A1* | 6/2016 | Bufe, III ........... G06F 16/24575 707/723 |
| 2019/0220967 A1* | 7/2019 | Bhatt .................... G06T 7/0002 |
| 2019/0258647 A1* | 8/2019 | Baughman ............ G06N 20/00 |

* cited by examiner

IMAGE ANALYSIS DEVICE AND METHOD, AND METHOD FOR GENERATING IMAGE ANALYSIS MODEL USED FOR SAME

CROSS-REFERENCE TO RELATED APPLICATIONS

This application is a bypass continuation application of International PCT Application No. PCT/KR2020/000291, filed on Jan. 7, 2020, which claims priority to Republic of Korea Patent Application No. 10-2019-0026852, filed on Mar. 8, 2019, which are incorporated by reference herein in their entirety.

TECHNICAL FIELD

The present disclosure relates to an apparatus and method for analyzing an input image and a method for generating an image analysis model used therefor.

BACKGROUND

Computer Vision refers to a technology of generating useful information by analyzing features of surrounding objects and environments from images input through a visual medium such as a camera and a scanner. In recent years, the computer vision technology has been applied to CCTV or mobile phone cameras to detect and classify a desired object such as a person, a vehicle, an animal, and the like.

Before the introduction of machine learning technologies such as Deep Learning, objects were detected by searching for various features in images. Representative features used for object detection include Histogram of Oriented Gradients (HOG), Aggregated Channel Features (ACF), LBP (Local Binary Pattern), and the like. A desired object can be detected from an input image based on such features, and a feature-based object detecting method has been widely used due to the high cost of hardware and legacy of the deep learning-based object detecting method.

Nevertheless, in order to obtain more accurate object detection results in various object detecting environments, studies are actively being conducted on various computer vision or image processing technologies based on deep learning.

SUMMARY

In view of the above, the present disclosure provides an image analysis apparatus and method for determining whether to classify a target image into a new category based on a probability of the target image to belong to an input category of at least one expert of an image analysis model, and a method for generating an image analysis model used therefor.

In accordance with an aspect of the present disclosure, there is provided an image analysis method comprising, inputting a target image to an image analysis model composed of at least one expert generated by learning the training image; analyzing the target image based on an output value from the at least one expert; determining validity of an analysis result for the target image based on a probability of the input target image to belong to an input category of the at least one expert; and when it is determined that the analysis result for the target image is not valid, classifying the target image into a new category.

Herein the determining of the validity of the analysis result for the target image comprises randomly determining the validity of the analysis result for the target image based on a probability of the input target image to belong to the input category of the at least one expert.

Herein the determining of the validity of the analysis result for the target image comprises: obtaining a likelihood of an input and a class with respect to each of the at least one expert; obtaining a prior probability of each of the at least one expert; and obtaining a probability of the input target image to belong to the input category of the at least one expert based on the obtained likelihood and the obtained prior probability.

Herein the obtaining the likelihood of an input and a class with respect to each of the at least one expert comprises: obtaining a first probability of a class with respect to each of the input target image and the at least one expert by using a discriminative model of each of the at least one expert; obtaining a second probability of an input with respect to each of the at least one expert by using a generative model of each of the at least one expert; and obtaining the likelihood of an input and a class with respect to each of the at least one expert based on the first probability and the second probability.

Herein the obtaining the second probability comprises estimating a lower bound of the second probability as the second probability.

The image analysis method further comprises, storing the target image classified into the new category in a memory; and when an accumulated capacity of target images stored in the memory is greater than or equal to a predetermined reference capacity, generating an expert for the new category by learning the target images stored in the memory.

Herein the generating of the expert for the new category comprises: labeling the target images stored in the memory; and generating the expert for the new category by learning the labeled target images.

In accordance with another aspect of the present disclosure, there is provided an image analysis apparatus, comprising: an image analysis unit configured to analyze a target image based on an image analysis model composed of at least one expert generated by learning training images; and a determination unit configured to determine validity of an analysis result for the target image based on a probability of the target image to belong to an input category of the at least one expert, wherein the image analysis unit classifies the target image into a new category when the analysis result for the target image is determined to be invalid.

The image analysis apparatus further comprises a memory configured to store the target image classified into the new category.

The image analysis apparatus further comprises a learning unit configured to, when an accumulated capacity of target images stored in the memory is greater than or equal to a predetermined reference capacity, generate an expert for the new category by learning the target images stored in the memory.

In accordance with still another aspect of the present disclosure, there is provided a method for generating an image analysis model, comprising: continually receiving first training images during a first receiving period; generating a first expert composed of a discriminative model and a generative model for a first category by learning the first training images during a first learning period right after the first receiving period; continually receiving second training images during a second receiving period right after the first learning period; determining whether to learn each of the second training images for the first expert based on a probability of each of the second training images to belong to the first category; and generating a second expert for a second category by learning, during a second learning period right after the second receiving period, a training image determined not to be learned for the first expert among the second training images.

According to an embodiment of the present disclosure, it is possible to manage an image analysis model capable of analyzing various target images in actual use environments by classifying a target image not belonging to an input category of an expert of an image analysis model.

When the image analysis model generated by learning a training image is used in an actual use environment, an input target image may be acquired under an acquisition condition different from that of the training image or may include an object that have not been learned through the training image. As a result, the image analysis model not only decreases in the accuracy of analysis, but also cannot operate adaptively to the necessity of detecting a new object while the image analysis model is used.

However, in an embodiment of the present disclosure, by classifying a target image into a new category and using the target image to generate a new expert, it is possible to analyze a variety of target images that can be input in an actual use environment. Specifically, the image analysis apparatus according to an embodiment of the present disclosure is able to operate adaptively to an input target image by employing incremental learning, which is to add new information to an image analysis model previously generated by machine learning such as deep learning, and continual learning, and as a result, the usability of the apparatus may increase in an actual use environment.

In particular, when the Intelligent Video Analytics (IVA) technology according to an embodiment of the present disclosure is applied in a fixed CCTV environment in which the camera hardly moves, accurate analysis of an acquired image may be performed regardless of the position and angle of the installed camera.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
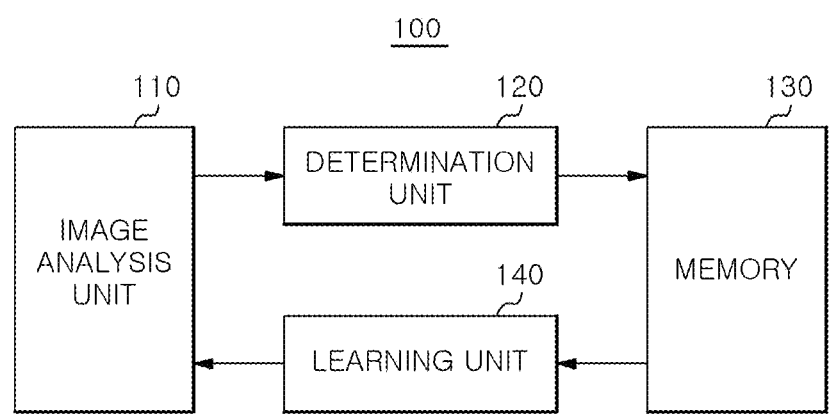
FIG. 1 is a functional block diagram of an image analysis apparatus according to an embodiment of the present disclosure.

FIG. 1 is a functional block diagram of an image analysis apparatus according to an embodiment of the present disclosure.

The image analysis apparatus refers to an apparatus that analyzes an input target image. Here, the target image is an image to be analyzed, and may include a still image and a video implemented as a stream of still images. In addition, image analysis refers to all processes of acquiring information on an object in the target image and the background other than the object, and may include classification and/or detection of the object in the image.

In order to increase the accuracy of image analysis, attempts to apply machine learning such as deep learning in image analysis have been actively conducted. Examples of image analysis models to which deep learning is applied include R-CNN, Faster R-CNN, Mask R-CNN, SSD, DSSD, Yolo, and the like.

An image analysis model to which deep learning is applied needs to learn a learning database (DB) collected for a long time in order to classify and/or detect a limited number of objects. However, in order to apply the deep learning-based image analysis model to real services such as a CCTV service, autonomous driving, and the like, a learning database suitable for a corresponding environment must be established in advance, and the established learning database must contain at least tens of thousands of training images for each object.

As described above, since the number of training images increases in proportion to the number of objects that can be analyzed, it is practically impossible for an image analysis model applied to an actual service to be trained to classify and/or detect every object. Accordingly, the image analysis model provided for practical use may be able to classify and/or detect only a limited number of objects.

If image analysis for a new object is required while an image analysis service is provided using an image analysis model that operates with respect to a predetermined number of objects, the following three methods may be followed. Hereinafter, it is assumed that a new object, i.e., a vehicle, is added to an image analysis model using a person as an object.

The first method is to learn and generate an image analysis model for the vehicle, separately from the image analysis model for a person. For example, it is possible to generate a "vehicle detection" deep learning network model as an image analysis model by collecting and learning various vehicle images. In this case, image analysis for both a person and a vehicle is possible, but hardware resources may be doubled or more because both the image analysis model for the person and the image analysis model for the vehicle should be operated.

The second method is to train an image analysis model using both a person and a vehicle as objects by collecting a new training DB for vehicles together with a training DB used for training an existing image analysis model for humans. This method is similar to the first method in that it collects the new training DB for vehicles, but there is a limitation that it can be used only when there is a training DB used for training a human image analysis model with humans. In addition, there is a possibility that the performance of the analysis of humans by an image analysis model decreases compared to the performance of a first image analysis model after completion of training.

The third method is to train the vehicle DB on the existing human image analysis model. The advantage of this method is that it does not require a previously used training DB for humans, but when a vehicle DB for an image analysis model for humans is trained, it leads to a catastrophic forgetting phenomenon that deteriorates the performance of analysis of humans. That is, if the already generated image analysis model for a person is trained with the training DB of a new object, which is a vehicle, the image analysis model based on the training result improves the image analysis performance for the vehicle, while the image analysis performance for the person is degraded.

As described above, when an image in an environment different from that of the training DB used to generate the image analysis model is input, it is difficult to ensure the accuracy of the analysis result in all the three methods described above. In particular, although the third method has advantages over the first and second methods in that only the previously generated image analysis model is used regardless of the training DB used to generate the image analysis model, the image analysis performance of the third method deteriorates as learning of a new object is performed, and thus, it is difficult to apply the third method in a real-world environment.

In order to solve this problem, the image analysis apparatus according to an embodiment of the present disclosure may employ the basic concept of a Dirichlet Process Mixture Model (DPMM), which is one of the clustering algorithms. Hereinafter, the DPMM will be briefly described.

The DPMM refers to a clustering algorithm that performs clustering without pre-determining the number of clusters. While the k-means clustering algorithm, which is a representative clustering algorithm, has the number of clusters k as a hyper-parameter, the hyper-parameter of the DPMM has sensitivity α. In the DPMM, the clustering result is determined by sensitivity and data, and the number of clusters tends to increase as the value of α increases.

The representative method of learning the DPMM is Gibbs Sampling method. Initially, when N number of data is given, a cluster is randomly allocated to each data and initialization is performed. In this case, the method of allocating the cluster does not affect the result if sufficient learning time is given. When the initialization is complete, one data is randomly selected at each step and the cluster is reallocated. In this case, the randomly selected data may be allocated to a new cluster or may be allocated to an existing cluster. If the data to be re-allocated is xi, the probability P1 of xi to be allocated to an existing cluster c and the probability P2 of xi to be allocated to a new cluster are defined by Equations 1 and 2, respectively.

$$P_1 = b \frac{N_c}{N-1+\alpha} F(x_i, \phi_c) \quad \text{[Equation 1]}$$

$$P_2 = b \frac{\alpha}{N-1+\alpha} \int F(x_i, \phi) dG_0(\phi) \quad \text{[Equation 2]}$$

Here, α denotes sensitivity, b denotes a normalization constant, N denotes the total number of data, and Nc denotes the number of data allocated to the cluster c. In addition, Φc is a parameter of the cluster c, and may refer to an average and a variance when each cluster follows a normal distribution.

F(xi, Φc) refers the likelihood of the data xi with respect to Φc, and $$\frac{N_c}{N-1+\alpha}$$

refers a prior probability of the cluster c. Furthermore, G0(Φ) denotes a base distribution, which is another hyper-parameter, and may refer to a prior probability of the distribution of Φ.

When a new cluster is allocated based on the above-described probabilities, the parameter Φc of each cluster may be adjusted. Specifically, like the maximization step of the expectation maximization (EM) algorithm, it is possible to use data allocated to a corresponding cluster to adjust Φc according to the Maximum Likelihood Estimate (MLE) or the Maximum A Posteriori (MAP) estimate.

Like the DPMM clustering algorithm that automatically determines the number of clusters, the image analysis apparatus according to an embodiment of the present disclosure may automatically determine the number of experts of an image analysis model based on an input training image.

Referring to FIG. 1, an image analysis apparatus 100 according to an embodiment of the present disclosure may include an image analysis unit 110, a determination unit 120, a memory 130, and a learning unit 140.

The image analysis unit 110 may analyze a target image based on an image analysis model composed of at least one expert. Here, an expert may refer to an individual model for image analysis. Accordingly, the expert may be called an expert model or an expert module.

The image analysis model used by the image analysis unit 110 is composed of at least one expert generated by learning a training image, and the image analysis apparatus 100 may input a target image to at least one expert corresponding to an input target image and analyze the target image based on an output value.

If an expert corresponding to the input target image among at least one expert of the image analysis model is used, the accuracy of the image analysis result may improve. In particular, if an expert is generated by learning a training image similar to the target image, it is more likely to effectively analyze the target image.

Based on the above, a Mixture of Experts (MoE), which is a combination of at least one expert and a gate network, may be used as an image analysis model. Based on the input data and the performance of each expert, the gate network may determine an expert which is to obtain an output value. Specifically, MoE may model a probability p(y|x,Ek) of the input value x to the k-th expert and the class y of the k-th expert Ek, and the probability p(Ek|x) of the k-th expert Ek with respect to the input value x in the gate network. As a result, the MoE may obtain the class y with respect to the input value x based on Equation 3.

$$p(y \mid x) = \sum_k p(y \mid x, E_k) p(E_k \mid x)$$ [Equation 3]

Referring to Equation 3, the gate network may perform the role of a classifier to find an expert corresponding to the input value x before the expert receives the input value x. In this case, since it is necessary to newly learn the input value corresponding to the corresponding expert in order to generate a new expert at a specific point in time, the above-described catastrophic forgetting phenomenon may occur. In other words, while learning data corresponding to the new expert, the image analysis model may forget what has been learned.

To solve this, the image analysis unit 110 according to an embodiment of the present disclosure may use an image analysis model different from the gate-based MoE. Hereinafter, an image analysis model according to an embodiment of the present disclosure will be described with reference to FIGS. 2 and 3.

Figure 2:
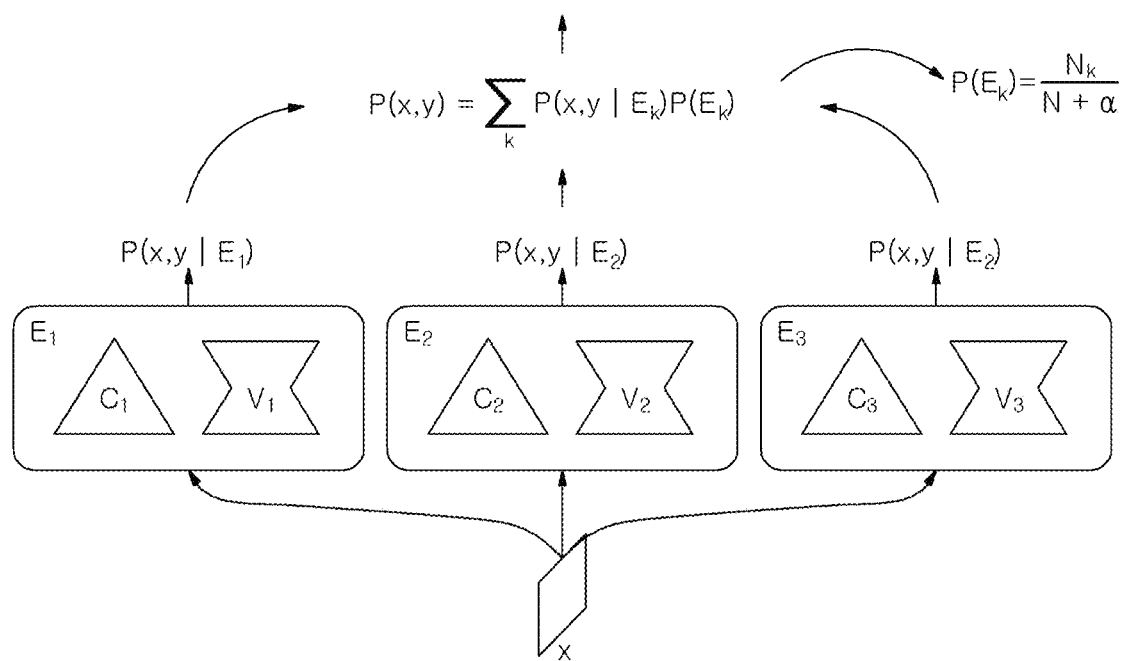
FIG. 2 is a diagram illustrating a process of outputting an output value from an image analysis model according to an embodiment of the present disclosure.
Figure 3:
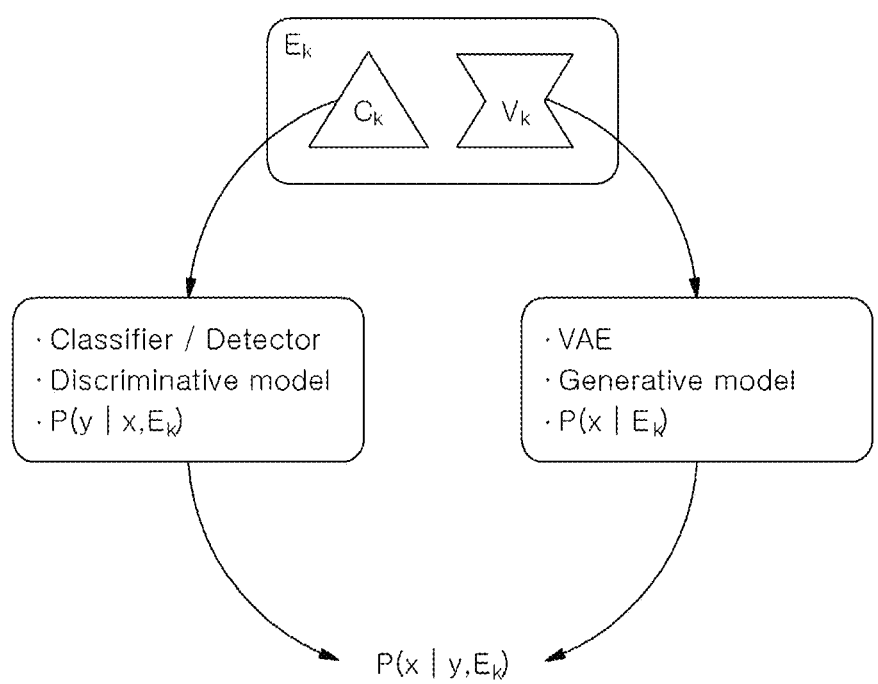
FIG. 3 is a diagram illustrating an expert of an image analysis model according to an embodiment of the present disclosure.

FIG. 2 is a diagram illustrating a process of outputting an output value from an image analysis model according to an embodiment of the present disclosure, and FIG. 3 is a diagram illustrating an expert of an image analysis model according to an embodiment of the present disclosure.

The image analysis unit 110 according to an embodiment of the present disclosure may set the input value x and the class y as one data point, and may use an image analysis model to which the DPMM clustering algorithm described above is applied. Such an image analysis model may operate to find an appropriate cluster by clustering data for which each expert is responsible.

Hereinafter, such an image analysis model is referred to as a Dirichlet Process Mixture of Experts (DPMoE) image analysis model.

The DPMoE image analysis model may input the input value x to each of at least one expert. FIG. 2 illustrates an example in which the DPMoE image analysis model is composed of a first expert E1, a second expert E2, and a third expert E3, and the input value x may be input to each of the three experts E1, E2, and E3.

In order to apply the above-described DPMM clustering algorithm, the DPMoE image analysis model may replace F(xi, Φ) in Equation 1 with a probability P(x,y|Ek) of the input value x and the class y with respect to the k-th expert Ek. To this end, each of the at least one expert of the DPMoE image analysis model may be composed of a discriminative model for predicting a probability p(y|x,Ek) of the input value x and the class y with respect to the k-th expert Ek and a generative model for predicting a probability p(x|Ek) of the input value x with respect to the k-th expert Ek.

Referring to FIG. 2, the k-th expert Ek may be composed of a discriminative model Ck and a generative model Vk. The discriminative model Ck may be implemented as a classifier and/or detector for classifying and/or detecting the class y corresponding to the input value x, and may output the probability p(y|x,Ek) as an output value.

The discriminative model Ck according to an embodiment may be learned by machine learning such as deep learning, and may be implemented as a neural network model such as Convolution Neural Network (CNN), Deep Neural Network (DNN), Recurrent Neural Network (RNN), and Bidirectional Recurrent Deep Neural Network (BRDNN).

The generated model Vk may be implemented as a Variational Auto Encoder (VAE) or the like to obtain a similarity with the input value x used for learning of the k-th expert Ek, and may output the probability p(x|Ek) as an output value. In this case, since it may be difficult to accurately predict the probability p(x|Ek), the generative model Vk of the DPMoE image analysis model according to an embodiment of the present disclosure may obtain the lower bound of the probability p(x|Ek), for example, the Evidence Lower Bound (ELBO), and estimate the obtained lower bound as the probability p(x|Ek).

The generative model Vk according to another embodiment may be learned by machine learning such as deep learning and implemented as a neural network model such as CNN, DNN, RNN, and BRDNN.

As a result, at least one expert of the DPMoE image analysis model may multiply the probability p(y|x,Ek) output from the discriminative model Ck and the probability p(x|Ek) output from the generative model Vk to thereby output the probability P(x,y|Ek) of the input value x and the class y with respect to each expert Ek. FIG. 2 illustrates an example in which the experts E1, E2, and E3 of the DPMoE image analysis model multiple probabilities (y|x,E1), p(y|x,E2), and p(y|x,E3) respectively output from discriminative models C1, C2, and C3 and probabilities p(x|E1), p(x|E2), and p(x|E3) output from the generative models Vk, V2, and V3 to thereby output a probability P(x,y|E1) of the input value x and the class y with respect to the expert E1, a probability P(x,y|E2) of the input value x and the class y with respect to the expert E2, and a probability P(x,y|E3) of the input value x and the class y with respect to the expert E3.

In addition, the DPMoE image analysis model may replace $$\frac{N_c}{N - 1 + \alpha}$$

in Equation 1 with a prior probability P(Ek) for the k-th expert Ek. In this case, similarly to the DPMM, the prior probability P(Ek) may be determined to be proportional to the number of data learned by the k-th expert Ek. Specifically, the prior probability P(Ek) may follow Equation 4.

$$P(E_k) = \frac{N_k}{N + \alpha}$$ [Equation 4]

Here, N denotes the total number of data, Nk denotes the number of data learned by the k-th expert Ek, and α denotes sensitivity.

If the DPMM clustering algorithm is appropriately modified as described above, the DPMoE image analysis model may output a probability p(y|x) of the class y with respect to the input value x as an output value. Specifically, the DPMoE image analysis model may multiply the obtained probabilities P(x,y|Ek) and p(Ek) regarding each expert and then adding all the results to obtain a probability P(x,y) of the input value x and the class y. Using the obtained probability P(x,y), the DPMoE image analysis model may output a probability p(y|x) of the class y with respect to the input value x as an output value according to Equation 5.

$$p(y \mid x) = \frac{p(x, y)}{p(x)} = \frac{\Sigma_k p(x, y \mid E_k) p(E_k)}{\Sigma_k p(x \mid E_k) p(E_k)} \quad \text{[Equation 5]}$$

Lastly, the image analysis unit 110 may obtain the class y, i.e. a result of analysis of a target image, for the input value x, i.e., the target image. If the image analysis model is implemented as a classifier, the image analysis unit 110 may obtain a target image classification result according to the type of an object in the target image. In contrast, if the image analysis model is implemented as a detector, the image analysis unit 110 may obtain a object detection result in the target image according to the existence and position of a specific object in the target image.

The determination unit 120 may determine validity of the analysis result for the target image based on the image analysis model. Specifically, the determination unit 120 may determine the validity of the analysis result for the target image based on a probability of the target image to belong to an input category of at least one expert. Here, the input category refers to a category that can be determined as an image of the same kind as that of a training image used for learning of the corresponding expert, and the input category may be determined by the type of an object, the location of the object, an image acquisition environment, and the like.

Also, when it is determined that the analysis result for the target image is not valid, the determination unit 120 may classify the target image into a new category. Furthermore, the determination unit 120 may store the target image, classified into the new category, in the memory 130. In addition, the learning unit 140 may generate a new expert for the new category by learning the target image stored in the memory 130.

Hereinafter, a method for generating an expert for a new category will be described with reference to FIGS. 4 to 6.

Figure 4:
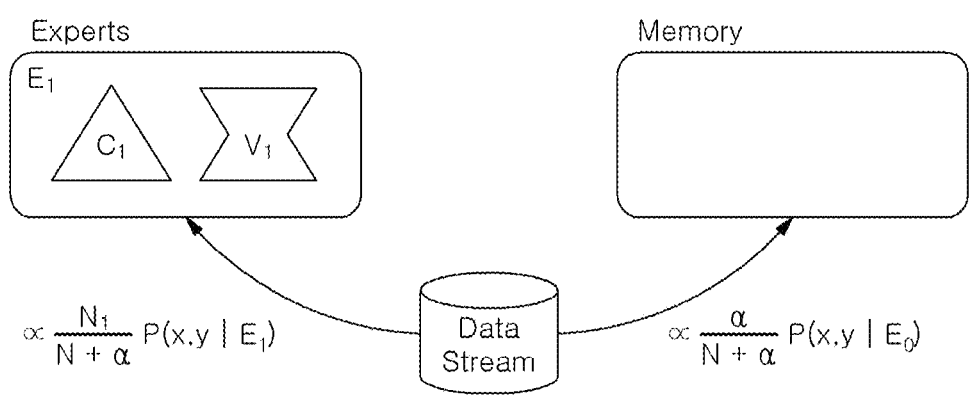
FIGS. 4 to 6 are diagrams for explaining a method of generating an expert for a new category by an image analysis apparatus according to an embodiment.
Figure 5:
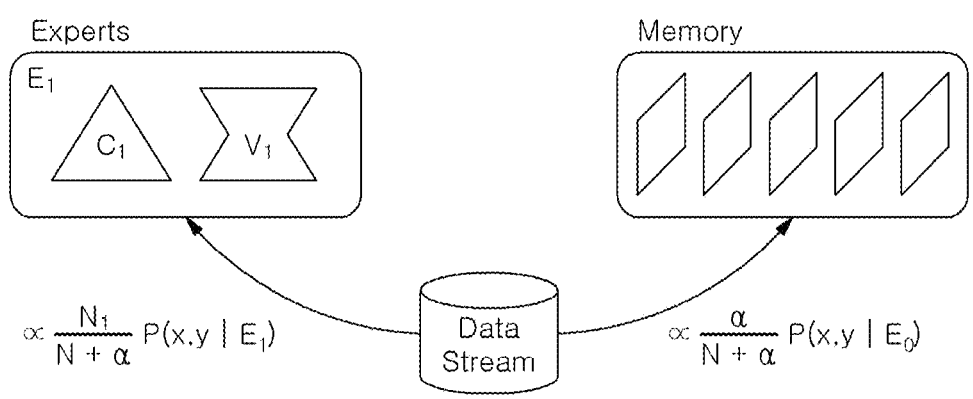
Figure 6:
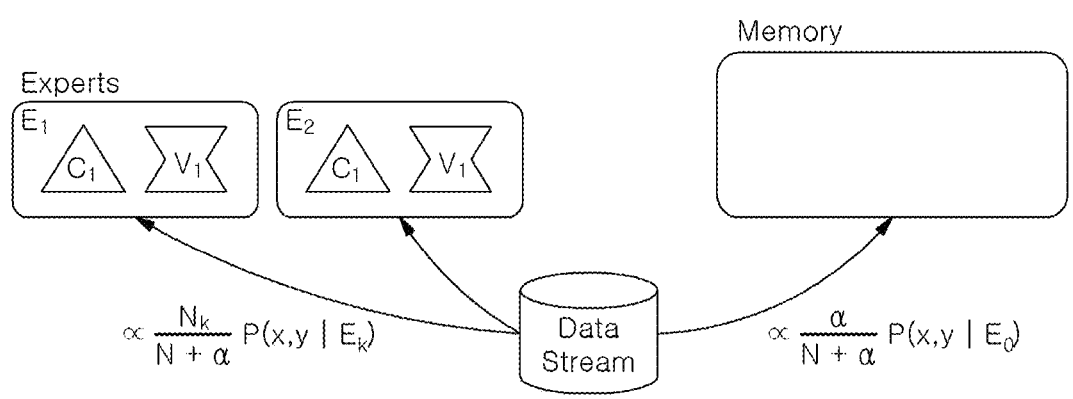

FIGS. 4 to 6 are diagrams for explaining a method of generating an expert for a new category by an image analysis apparatus according to an embodiment.

When analysis of a target image is completed, the determination unit 120 may determine whether the target image belongs to an input category of at least one expert of an image analysis model or to a new category. To this end, the determination unit 120 may obtain a probability P11 of the target image to belong to the input category and a probability P22 of the target image to belong to the new category.

In this case, since the image analysis model according to an embodiment of the present disclosure employs the DPMM clustering algorithm, the probability P11 of the target image to belong to the input category may correspond to the probability P1 of xi in Equation 1 to be allocated to the existing cluster c and the probability P22 of the target image to belong to the new category may correspond to the probability P2 of xi in Equation 2 to be allocated to a new cluster. Accordingly, the determination unit 120 may determine the probability P11, which is a probability of the target image to belong to the input category, in proportion to $$\frac{N_k}{N + \alpha} P(x, y \mid E_k)$$

(here, N denotes the total number of data, Nk denotes the number of data learned by the k-th expert Ek, and α denotes the sensitivity), and may determine the probability P22, which is a probability of the target image to belong to the new category, in proportion to $$\frac{\alpha}{N + \alpha} P(x, y \mid E_0)$$

(here, N denotes the total number of data, α denotes the sensitivity, and E0 denotes the new expert having the new category). FIG. 4 illustrates an example in which the determination unit 120 makes use of the facts that the probability P11 to belong to the input category of one expert E1 is proportional to $$\frac{N_1}{N + \alpha} P(x, y \mid E_1)$$

and that the probability P22 to belong to the new category is proportional to $$\frac{\alpha}{N + \alpha} P(x, y \mid E_0).$$

When the probability P11 and the probability P22 are determined, the determination unit 120 may randomly determine the validity of the analysis result for the input target image based on the determined probabilities. In FIG. 4, if the probability P11 is higher than the probability P22, the determination unit 120 is highly likely to determine that the analysis result for the target image is valid, but the determination unit 120 may classify the target image into the new category after determining that the analysis result is not valid. In contrast, if the probability P22 is higher than the probability P11, the determination unit 120 is highly likely to determine that the analysis result for the target image is not valid, but the determination unit 120 may determine that the analysis result is valid.

When the determination unit 120 determines that the analysis result for the target image is valid, the analysis result itself may be provided to a user or a related service may be provided to the user using the analysis result.

On the other hand, when the analysis result for the target image is determined to be invalid and the target image is classified into the new category, the determination unit 120 may store the target image in the memory 130. If an input target image is in the form of a data stream in which a frame image is input every frame, the determination unit 120 may determine validity of the analysis result for a target image every frame and then continually store, in the memory 130, target images for which the analysis results are determined to be invalid. Referring to FIG. 5, the memory 130 may continually accumulate and store input target images for a new category.

To this end, the memory 130 according to an embodiment of the present disclosure may be implemented as a storage medium such as a random access memory (RAM), a static random access memory (SRAM), a read-only memory (ROM), a programmable read-only memory (PROM), and Electrically Erasable Programmable Read-Only Memory (EEPROM), or may be implemented as a virtual storage space by a cloud server. In contrast, the memory 130 may be implemented as a short-term memory.

The learning unit 140 may generate an expert for a new category by learning target images stored in the memory 130. To this end, the learning unit 140 according to an embodiment may learn the target images stored in the memory 130 when an accumulated capacity of the target images stored in the memory 130 is greater than or equal to a predetermined reference capacity. Here, the reference capacity may refer to a minimum value of the accumulated capacity of the target images sufficient to generate a new expert.

In contrast, the learning unit 140 according to another embodiment may learn the target images stored in the memory 130 when a predetermined reference time elapses. Here, the reference time may refer to a minimum value of the accumulated time of target images sufficient to generate a new expert. If the aforementioned reference time elapses, the learning unit 140 according to another embodiment may learn the target images stored in the memory 130 only when the accumulated capacity of the target images stored in the memory 130 is greater than or equal to the reference capacity.

The learning unit 140 according to an embodiment may generate a new expert by supervised learning. Since the supervised learning is performed by learning a labeled input, the target images accumulated in the memory 130 need to be labeled with an object prior to the supervised learning. According to an embodiment of the present disclosure, the labeling may be performed on each of the accumulated target images based on an external input. In contrast, the labeling may be automatically performed by inputting the accumulated target images to a separate model for labeling, for example, a classifier and/or a detector for an object in an input image.

When the supervised learning is performed, the learning unit 140 may learn the target images with the target images accumulated in the memory 130 as an input to the convolution layer and correlating the input with a predetermined class for a label. That is, the learning unit 140 may learn the relationship between an input target image and the correct answer of an object to thereby generate a new expert capable of analyzing the object in the input target image.

In contrast, the learning unit 140 may generate a new expert by semisupervised learning, which is a method of learning based on both some target images with the object being labeled and the other target images without the object being labeled. Alternatively, the learning unit 140 may generate a new expert by reinforcement learning, which is a method of learning based on a feedback on whether a learning result is correct.

FIG. 6 illustrates an example in which the learning unit 140 generates a new expert E2 based on target images classified into a new category and accumulated in the memory 130.

After the new expert E2 is generated, the image analysis unit 110 may analyze a newly input target image using an image analysis model including the new expert E2. After analyzing the newly input target image, the determination unit 120 may determine validity of the analysis result for the new target image. Specifically, the determination unit 120 may obtain a probability P11 of the new target image to belong to an input category and a probability P22 of the target image to belong to the new category. In this case, the determination unit 120 may obtain a probability P11 of the input target image to belong to the input category of each of the experts E1 and E2. Based on the obtained probability, the determination unit 120 may randomly determine the validity of the analysis result.

Until now, a case where target images classified into a new category are accumulated in the memory 130 and then the learning unit 140 learns the target images at once has been described. In contrast, the image analysis apparatus 100 according to another exemplary embodiment may omit the configuration of the separate memory 130, and when a target image is classified into a new category, the image analysis apparatus 100 may immediately learn the target image to generate a new expert.

Referring back to FIG. 1, each component of the image analysis apparatus 100 according to an embodiment of the present disclosure may be implemented as a computing device including a microprocessor, for example, a central processing unit (CPU) and a graphic processing unit (GPU). In contrast, at least two of the components of the image analysis apparatus 100 may be implemented as a system on chip (SOC).

Until now, the configuration of the image analysis apparatus 100 has been described. Hereinafter, an image analysis method performed by the above-described image analysis apparatus 100 and a method of generating an image analysis model used therefor will be described.

Figure 7:
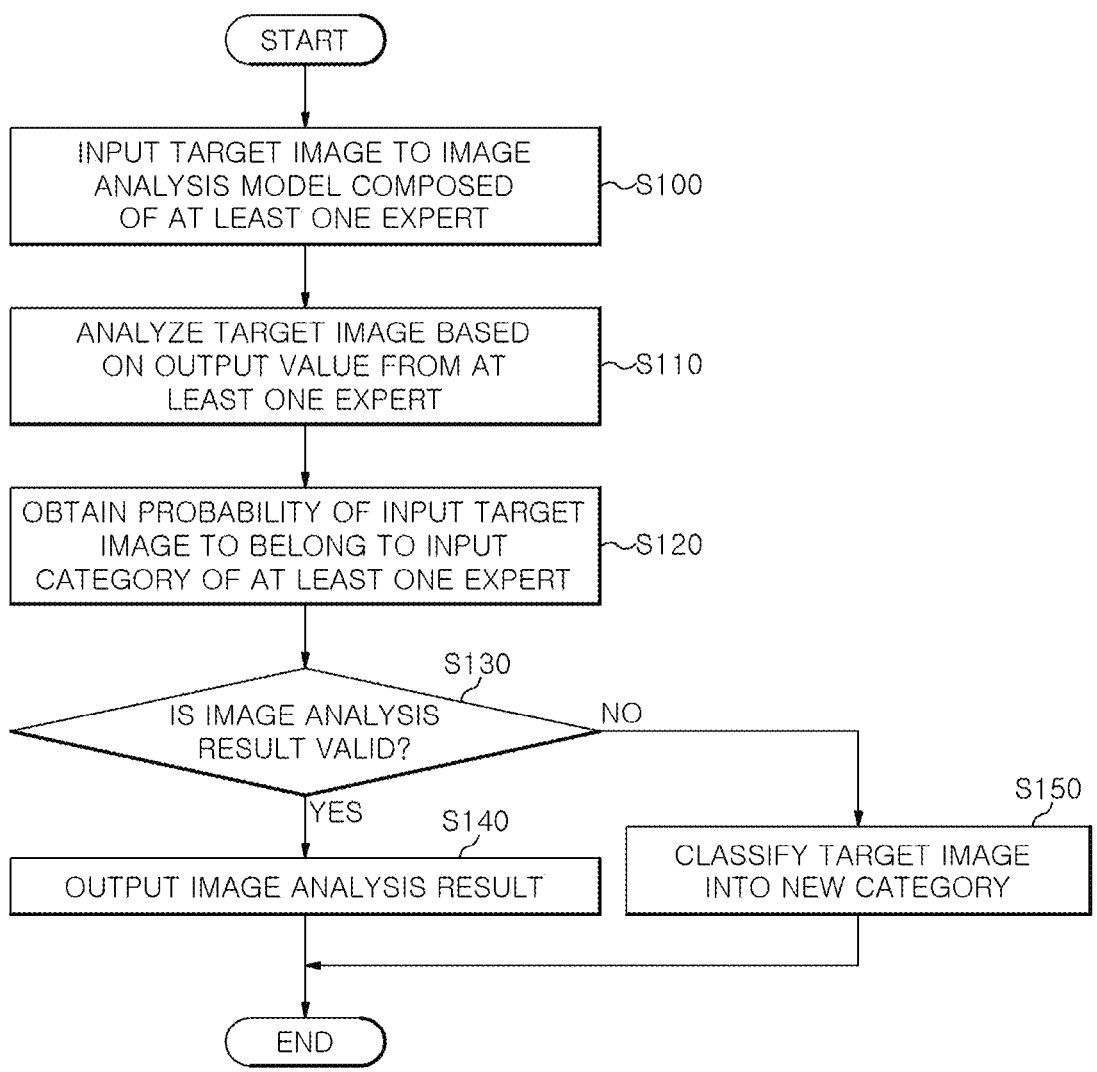
FIG. 7 is a flowchart of an image analysis method according to an embodiment of the present disclosure.

FIG. 7 is a flowchart of an image analysis method according to an embodiment of the present disclosure.

First, the image analysis apparatus 100 may input a target image to an image analysis model composed of at least one expert generated by learning a training image in operation S100. Here, the image analysis model refers to all processes of acquiring information on an object in a target image and the background other than the object, and is a model of performing image analysis including classification and/or detection of the object in the image. The image analysis model may be generated by learning a training image through machine learning such as deep learning. In this case, the image analysis model according to an embodiment may be implemented to set an input value and a class as one data point and apply the DPMM clustering algorithm thereto.

After inputting the target image to the image analysis model, the image analysis apparatus 100 may analyze the target image based on an output value from at least one expert in operation S110. If the image analysis model is implemented as a classifier, the image analysis apparatus 100 may obtain a target image classification result according to the type of an object in the target image. In contrast, when the image analysis model is implemented as a detector, the image analysis apparatus 100 may obtain a object detection result in the target image according to the existence and position of a specific object in the target image.

Then, the image analysis apparatus 100 may obtain a probability of the input target image to belong to an input category of at least one expert in operation S120. To this end, the image analysis apparatus 100 may first obtain a likelihood of an input and a class with respect to each of at least one expert. Specifically, the image analysis apparatus 100 may obtain a first probability of a class with respect to a target image and an expert by using a discriminative model of the expert, obtain a second probability of an input with respect to each expert by using a generative model of a corresponding expert, and then obtain likelihoods of an input and a class with respect to each of at least one expert based on multiplication of a first probability and a second probability. This is the same as described above with reference to FIGS. 2 and 3.

After obtaining the probability of the target image to belong to an input category of at least one expert, the image analysis apparatus 100 may determine validity of the analysis result for the input target image in operation S130. In this case, the image analysis apparatus 100 may randomly determine whether to analyze the input target image based on a probability of the input target image to belong to an input category of at least one expert. That is, whether or not to analyze the target image vary depending on the probability, but even if the probability of the target image to belong to the input category is high, it may be determined not to analyze the target image, and even if the probability of the target image to belong to a new category is high, it may be determined to analyze the target image.

When it is determined that the analysis result for the target image is valid, the image analysis apparatus 100 may output a valid image analysis result in operation S140. The image analysis apparatus 100 according to an embodiment may output an analysis result for the target image and provide the result directly to a user, or may provide the result to a service provider who provides a related service.

On the other hand, when it is determined that the analysis result for the target image is not valid, the image analysis apparatus 100 may classify the target image into a new category in operation S150. Further, the image analysis apparatus 100 may generate a new expert for a new category by storing the target image classified into the new category and learning the target image.

In doing so, when a target image for a new category is input after generation of the image analysis model or when a target image with an acquisition condition different from that of a training image is input, the image analysis apparatus 100 may easily generate a new category for a corresponding target image. In particular, since the catastrophic forgetting phenomenon does not occur, the image analysis model may newly provide the analysis performance for a target image in the new category while maintaining analysis performance for a target image in an existing category.

Figure 8:
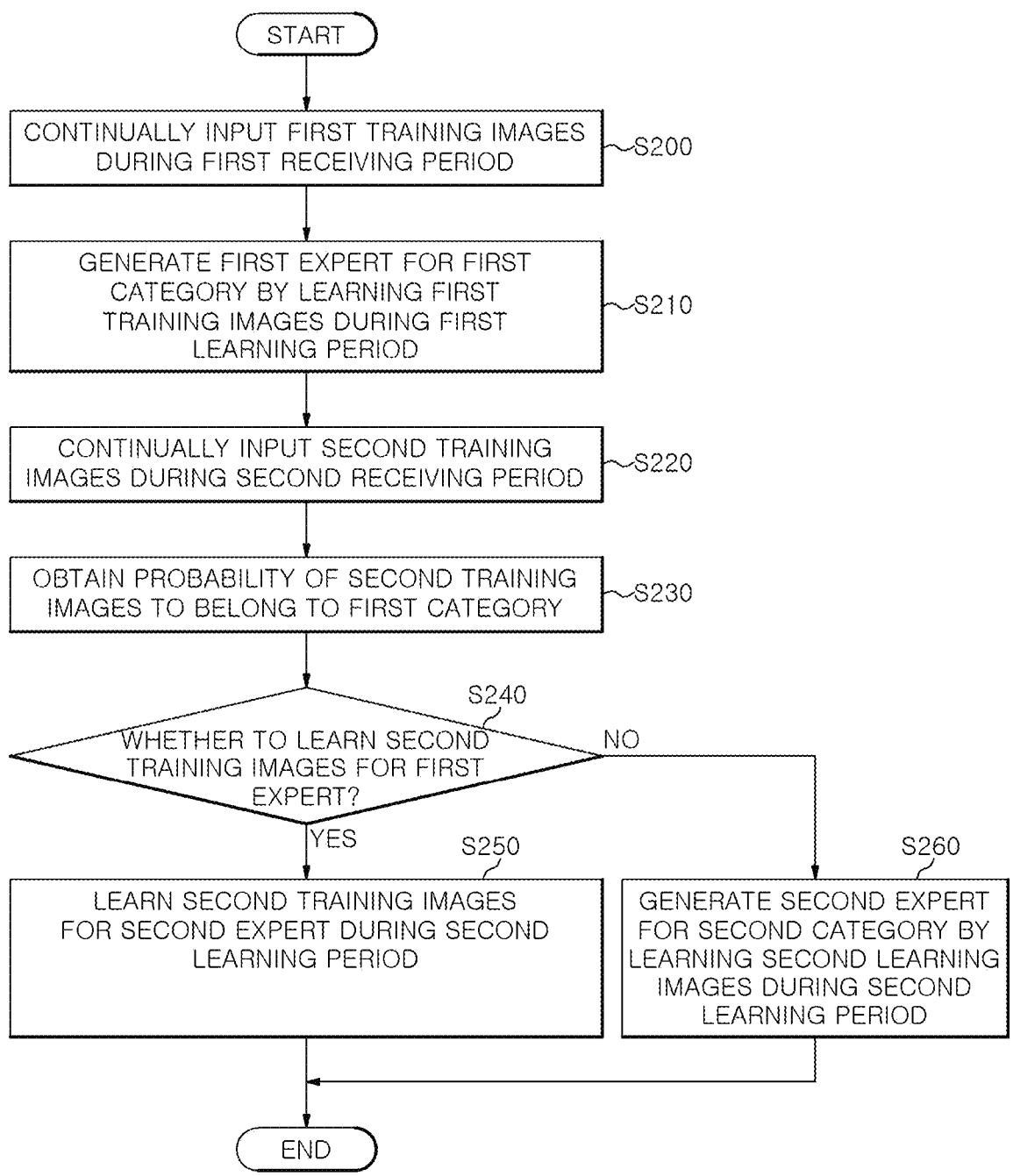
FIG. 8 is a flowchart of a method of generating an image analysis model according to an embodiment of the present disclosure.

FIG. 8 is a flowchart of a method of generating an image analysis model according to an embodiment of the present disclosure.

First, the image analysis apparatus 100 may continually receive first training images during a first receiving period in operation S200. When the first training images are input, the image analysis apparatus 100 may learn the first training images during a first learning period to generate a first expert composed of a discriminative model and a generative model for a first category in operation S210. Here, the first learning period may start from the end point of the first receiving period.

Then, during the second receiving period, second training images may be continually received in operation S220. Here, the second receiving period may start from the end point of the first learning period. When the second training images are input, the image analysis apparatus 100 may obtain a probability of each of the second training images to belong to a first category in operation S230. Based on this, the image analysis apparatus 100 may determine whether to learn each of the second training images for the first expert in operation S240.

When it is determined whether to learn each of the second training images for the first expert, the image analysis apparatus 100 may learn a training image determined to be learned for the first expert among the second training images for the first expert during the second learning period in operation S240. Here, the second learning period may start from the end point of the second receiving period.

Meanwhile, the image analysis apparatus 100 may generate a second expert for the second category by learning a training image determined not to be learned for the first expert among the second training images during the second learning period in operation S250.

By repeatedly performing such a process, the image analysis apparatus 100 may automatically cluster training images and generate an expert for each cluster even without a separate classification process. That is, a receiving period and a learning period may occur repeatedly, and the image analysis apparatus 100 may generate a new category by classifying training images of a new category in the receiving period and learning the classified training images during the learning period. As a result, the image analysis accuracy of the image analysis model may improve.

Until now, an apparatus and a method for analyzing a target image using an image analysis model generated by learning a training image have been described. However, if images are replaced with various types of data, the present disclosure may be extended to a data analysis apparatus and method. For example, a data analysis device according to an embodiment of the present disclosure may include a speech analysis device capable of analyzing a target speech using a speech analysis model generated by learning of a learning speech, a text analysis device capable of analyzing a target text using a text analysis model generated by a training text, and the like.

Until now, an image analysis method performed by the above-described image analysis apparatus 100 and a method of generating an image analysis model used therefor have been described. Hereinafter, the effect of the above-described image analysis method will be described.

Figure 9:
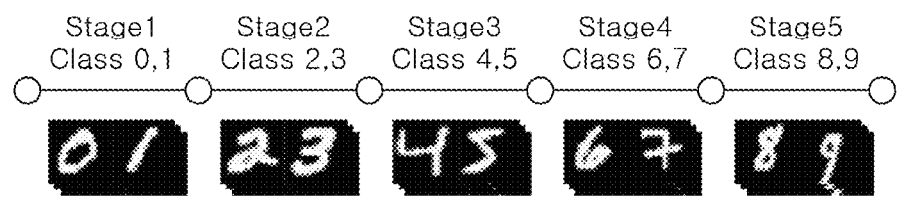
FIG. 9 is a diagram for explaining an input composed of a handwritten image in an experiment for verifying the effect of an image analysis method according to an embodiment of the present disclosure.
Figure 10:
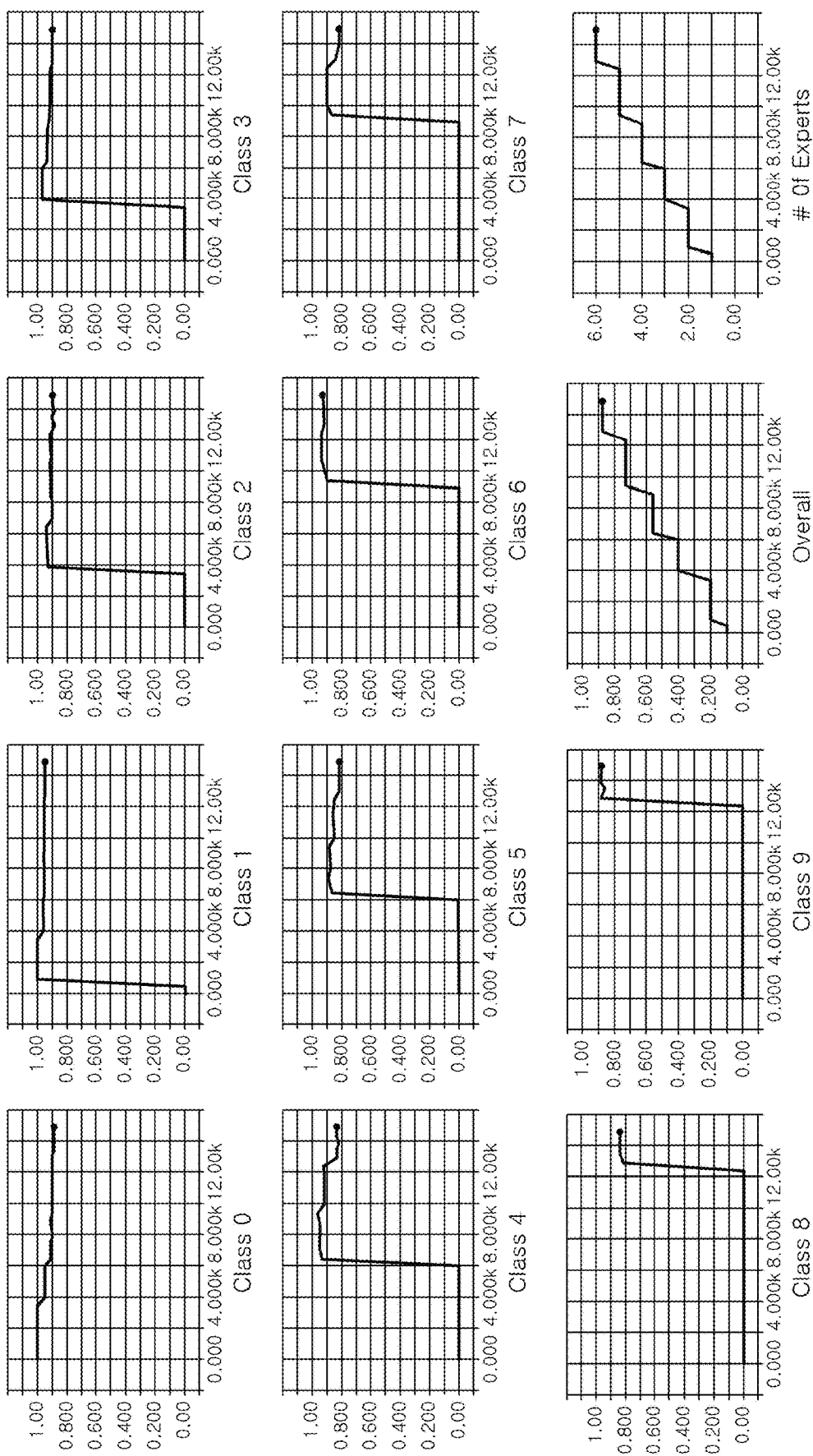
FIG. 10 is a graph showing analysis accuracy in an experiment for verifying the effect of the image analysis method according to an embodiment of the present disclosure on the input of FIG. 9.
Figure 11:
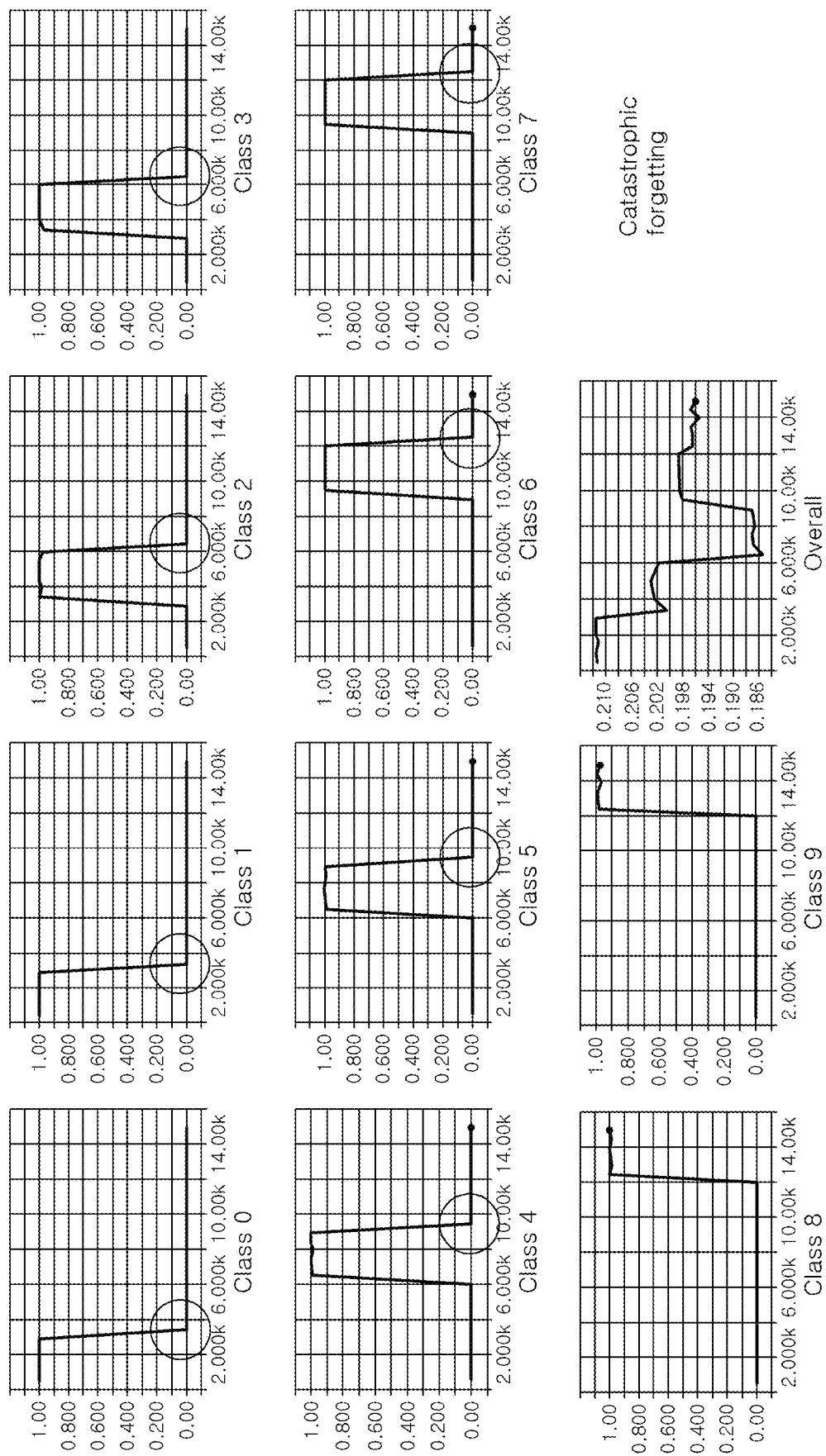
FIG. 11 is a graph showing analysis accuracy of an existing image analysis method as a control group of FIG. 10.

FIG. 9 is a diagram for explaining an input composed of a handwritten image in an experiment for verifying the effect of an image analysis method according to an embodiment of the present disclosure; FIG. 10 is a graph showing analysis accuracy in an experiment for verifying the effect of an image analysis method according to an embodiment of the present disclosure on the input of FIG. 9; and FIG. 11 is a graph showing analysis accuracy of an existing image analysis method as a control group of FIG. 10. In FIGS. 10 and 11, the x-axis represents the learning progress time, and the y-axis represents performance, that is, accuracy.

Referring to FIG. 9, input target images are configured as an MNIST data set obtained from a Modified National Institute of Standards and Technology database (MNIST), which consists of a total of five subsets. A first subset consists of Target images 0 and 1, a second subset consists of Target images 2 and 3, a third subset consists of Target images 4 and 5, a fourth subset consists of Target images 6 and 7, and a fifth subset consists of Target images 8 and 9.

In this experiment, an image analysis method according to an embodiment of the present disclosure was applied by continually learning the above-described plurality of subsets in 3000 stages. Each expert of a generated image analysis model is designed to have an MLP-based classifier as a discriminative model and a VAE as a generative model. Also, the classifier is composed of a simple 3-layer MLP.

The same experiment is also carried out on YOLO ver.2, one of the conventional deep learning-based real-time object detection networks, which is a control group for comparison with the above-described experimental group.

Referring to FIG. 10, when an image analysis model according to an embodiment of the present disclosure is applied, it can be seen that previous classification accuracy of each object hardly decreases even after a corresponding object is learned, and that the overall accuracy steadily increases to 0.87.

On the other hand, referring to FIG. 11, in the case of the existing image analysis method, it can be seen that only a currently learning subset is predicted with high accuracy and a catastrophic forgetting phenomenon occurs in previously learned subsets. As a result, the overall accuracy is about 0.2.

Figure 12:
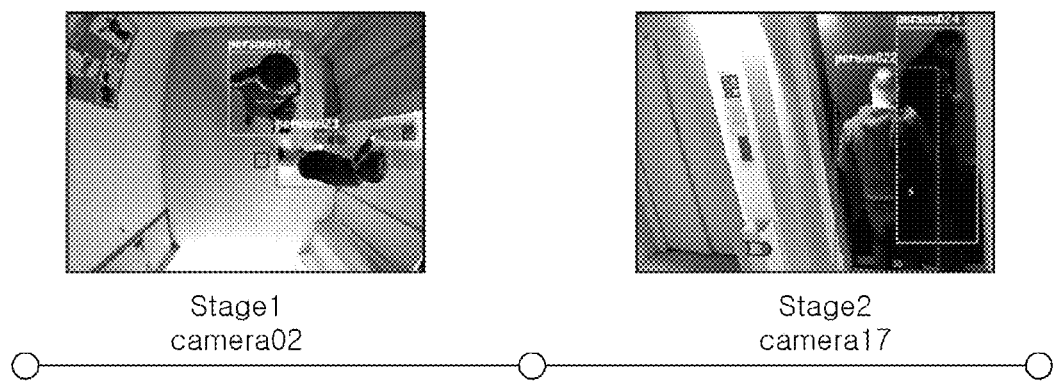
FIG. 12 is a diagram for explaining an input configured as a CCTV image in an experiment for verifying the effect of an image analysis method according to an embodiment of the present disclosure.
Figure 13:
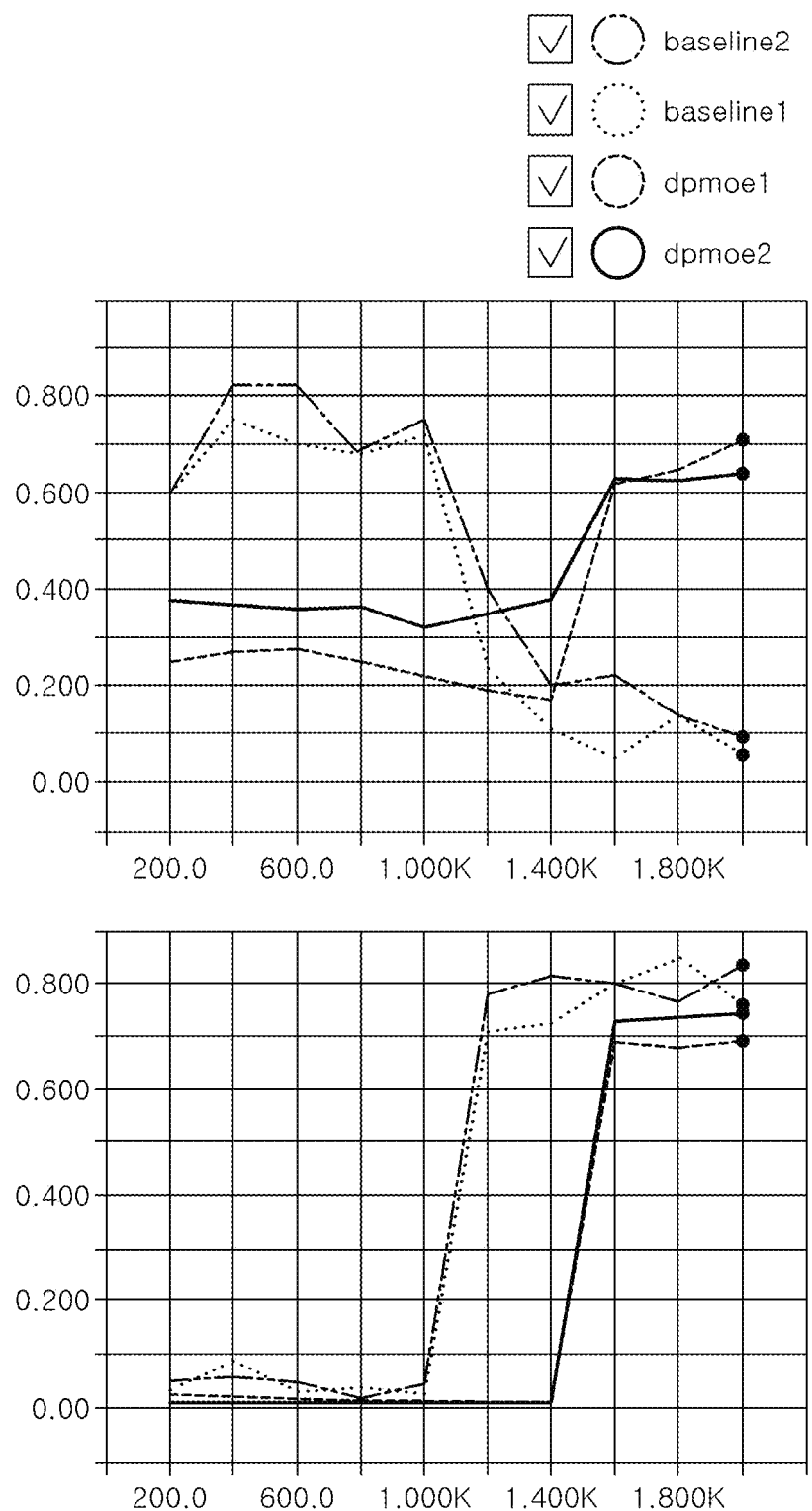
FIG. 13 is a graph showing analysis accuracy in an experiment for verifying the effect of an image analysis method according to an embodiment of the present disclosure on the input of FIG. 12.

FIG. 12 is a diagram for explaining an input composed of CCTV images in an experiment for verifying the effect of an image analysis method according to an embodiment of the present disclosure, and FIG. 13 is a graph showing analysis accuracy in an experiment for verifying the effect of an image analysis method according to an embodiment of the present disclosure on the input of FIG. 12. In FIG. 13, the x-axis represents the learning progress time, and the y-axis represents performance, that is, accuracy.

Referring to FIG. 12, the input target images are composed of two subsets obtained from an HDA Person data set. A first subset (Camera 02) is composed of a Top-View image directed from the top of a person's head to the bottom, and this is an image corresponding to a CCTV angle, which is photographed around the person's head and is often used for counting the number of people. A second subset (Camera 17) is composed of a Slanted-View image, which an image of not only a person's face but also a part of the body, and many CCTVs actually shoot images at this angle.

This experiment is to first learn a human object detection network in a Top-View image using a subset of Camera02 and then generate a deep learning network so that a person can be detected in a Slanted-View image using a subset of Camera17. An existing detector is able to detect a person well in a top-view image, but when a Slanted-View image is learned by such a detector, there is a high possibility for a catastrophic forgetting phenomenon in which the detection performance of a human object greatly deteriorates again in the top-view image.

In FIG. 13, the left graph is a performance graph for a subset of Camera02, and the right graph is a performance graph for a subset of Camera17. The performance of the conventional baseline detector and the performance of the DPMoE image analysis model according to an embodiment of the present disclosure were each observed twice. In the left graph, it can be seen that the accuracy of the conventional detector exhibiting high performance suddenly decreases at a point in time when the subset of Camera17 is input. On the other hand, the DPMoE image analysis model according to an embodiment of the present disclosure shows that even if the subset of Camera17 is input, the accuracy of the subset of Camera02 does not deteriorate. In the right graph, it can be seen that the accuracy of the conventional detector as well as the DPMoE image analysis model increases for the subset of Camera17 which is input later, but there is a noticeable difference in the accuracy therebetween for the subset of Camera02.

For an apparatus and method for analyzing an image according to the above-described various embodiments and a method for generating an image analysis model used therefor, it is possible to manage an image analysis model capable of analyzing various target images in actual use environments by classifying a target image not belonging to an input category of an expert of an image analysis model.

When the image analysis model generated by learning a training image is used in an actual use environment, an input target image may be acquired under an acquisition condition different from that of the training image or may include an object that have not been learned through the training image. As a result, the image analysis model not only decreases in the accuracy of analysis, but also cannot operate adaptively to the necessity of detecting a new object while the image analysis model is used.

However, in an embodiment of the present disclosure, by classifying a target image into a new category and using the target image to generate a new expert, it is possible to analyze a variety of target images that can be input in an actual use environment. Specifically, the image analysis apparatus according to an embodiment of the present disclosure is able to operate adaptively to an input target image by employing incremental learning, which is to add new information to an image analysis model previously generated by machine learning such as deep learning, and continual learning, and as a result, the usability of the apparatus may increase in an actual use environment.

In particular, when the Intelligent Video Analytics (IVA) technology according to an embodiment of the present disclosure is applied in a fixed CCTV environment in which the camera hardly moves, accurate analysis of an acquired image may be performed regardless of the position and angle of the installed camera.

Meanwhile, each step included in the image analysis method and the image analysis model generating method used therein according to the above-described embodiment may be implemented in a computer program programmed to perform these steps, or a computer-readable storage medium storing the computer program.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

According to an embodiment, the above-described apparatus and method for analyzing an image and the method of generating an image analysis model used therefor may be used in various applications such as indoors or industrial sites, and thus, have industrial applicability.

What is claimed is:

1. An image analysis method, comprising:
   receiving a target image for processing by an image analysis model composed of at least one expert generated by learning a training image;
   analyzing the target image based on an output value from the at least one expert to generate an analysis result;
   determining validity of the analysis result for the target image based on a probability of an input target image belonging to an input category of the at least one expert by at least:

obtaining a likelihood of an input and a class with respect to each of the at least one expert;

obtaining a prior probability of each of the at least one expert; and obtaining a probability of the input target image belonging to the input category of the at least one expert based on the obtained likelihood and the obtained prior probability; and responsive to determining that the analysis result for the target image is not valid, classifying the target image into a new category so that a new expert for the new category is trained using the target image.

2. The method of claim 1, wherein the determining of the validity of the analysis result for the target image comprises randomly determining the validity of the analysis result for the target image based on a probability of the input target image belonging to the input category of the at least one expert.

3. The method of claim 1, wherein the obtaining the likelihood of an input and a class with respect to each of the at least one expert comprises:

obtaining a first probability of a class with respect to each of the input target image and the at least one expert by using a discriminative model of each of the at least one expert;

obtaining a second probability of an input with respect to each of the at least one expert by using a generative model of each of the at least one expert; and obtaining the likelihood of an input and a class with respect to each of the at least one expert based on the first probability and the second probability.

4. The method of claim 3, wherein the obtaining the second probability comprises estimating a lower bound of the second probability as the second probability.

5. The method of claim 1, further comprising:

storing the target image classified into the new category in a memory; and when an accumulated capacity of images including the target image and stored in the memory is greater than or equal to a predetermined reference capacity, generating the new expert for the new category by performing training using the images stored in the memory.

6. The method of claim 5, wherein the generating of the expert for the new category comprises:

labeling the images stored in the memory; and generating the new expert for the new category by training the new expert using the labeled images.

7. An image analysis apparatus, comprising:

one or more processors;

a memory storing instructions thereon, the instructions when executed by the one or more processors cause the one or more processors to:

analyze a target image based on an image analysis model composed of at least one expert generated by learning training images to generate an analysis result;

determine validity of the analysis result for the target image based on a probability of the target image belonging to an input category of the at least one expert by at least:

obtaining a likelihood of an input and a class with respect to each of the at least one expert;

obtaining a prior probability of each of the at least one expert; and obtaining a probability of the input target image belonging to the input category of the at least one expert based on the obtained likelihood and the obtained prior probability; and responsive to determining that the analysis result for the target image is invalid, classify the target image into a new category so that a new expert for the new category is trained using the target image.

8. The apparatus of claim 7, further comprising: wherein the memory is further configured to store the target image classified into the new category.

9. The apparatus of claim 8, wherein the instructions further cause the one or more processors to:

when an accumulated capacity of images including the target image stored in the memory is greater than or equal to a predetermined reference capacity, generate the new expert for the new category by performing training using the images stored in the memory.

10. The apparatus of claim 9, wherein the instructions further cause the one or more processors to:

label the images stored in the memory, and generate the new expert for the new category by training the new expert using the labeled images.

11. The apparatus of claim 7, wherein the instructions further cause the one or more processors to randomly determine the validity of the analysis result for the target image based on a probability of the input target image belonging to the input category of the at least one expert.

12. The apparatus of claim 7, wherein the instructions further cause the one or more processors to:

obtain a first probability of a class with respect to each of the input target image and the at least one expert by using a discriminative model of each of the at least one expert, obtain a second probability of an input with respect to each of the at least one expert by using a generative model of each of the at least one expert, and obtain the likelihood of an input and a class with respect to each of the at least one expert based on the first probability and the second probability.

13. The apparatus of claim 12, wherein the instructions further cause the one or more processors to estimate a lower bound of the second probability as the second probability.

14. A method for generating an image analysis model, the method comprising:

continually receiving first training images during a first receiving period;

generating a first expert composed of a discriminative model and a generative model for a first category by learning the first training images during a first learning period right after the first receiving period;

continually receiving second training images during a second receiving period right after the first learning period;

determining whether to learn each of the second training images for the first expert based on a probability of each of the second training images to belong to the first category; and generating a second expert for a second category by learning, during a second learning period right after the second receiving period, a training image determined not to be learned for the first expert among the second training images.

* * * * *